United States Patent
Lamb et al.

(10) Patent No.: US 9,690,305 B2
(45) Date of Patent: Jun. 27, 2017

(54) SELF-CONTAINED THERMAL MIXING VALVE

(71) Applicant: Rostra Vernatherm, LLC, Bristol, CT (US)

(72) Inventors: Kevin W. Lamb, West Hartford, CT (US); Kenneth Lionello, Waterbury, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 324 days.

(21) Appl. No.: 14/336,020

(22) Filed: Jul. 21, 2014

(65) Prior Publication Data
US 2016/0018831 A1 Jan. 21, 2016

(51) Int. Cl.
*G05D 23/13* (2006.01)
(52) U.S. Cl.
CPC .................. *G05D 23/134* (2013.01)
(58) Field of Classification Search
CPC ........... G05D 23/1353; G05D 23/1393; G05D 23/1346; G05D 23/022; G05D 23/021; G05D 23/134; G05D 23/132; D06F 33/02; F16K 11/0743; F16K 31/002; F16K 15/025; F16K 31/0613; F16K 11/0716; F16K 19/00; F03G 7/06; F28F 27/02; Y10S 236/02; Y10T 137/2514; Y10T 137/7737
USPC ........... 236/12.11, 12.1, 12.16, 12.17, 12.18, 236/12.19, 12.2; 137/90, 625.4, 625.48; 285/381.1
See application file for complete search history.

(56) References Cited

U.S. PATENT DOCUMENTS

| 4,231,342 A * | 11/1980 | Johnston .............. F02M 55/007 |
| | | 123/513 |
| 4,475,684 A | 10/1984 | Garlick et al. |
| 6,079,625 A * | 6/2000 | Lebkuchner ....... G05D 23/1346 |
| | | 236/12.2 |
| 6,315,209 B1 | 11/2001 | Tripp |
| 6,517,006 B1 * | 2/2003 | Knapp ..................... F16K 3/34 |
| | | 137/625.41 |
| 6,772,958 B1 | 8/2004 | Lamb et al. |
| 7,469,841 B1 | 12/2008 | Lamb et al. |

(Continued)

FOREIGN PATENT DOCUMENTS

| FR | WO 2005103853 A1 * | 11/2005 | ......... G05D 23/1346 |
| FR | WO 2013083704 A1 * | 6/2013 | ......... G05D 23/1346 |

*Primary Examiner* — Frantz Jules
*Assistant Examiner* — Schyler S Sanks
(74) *Attorney, Agent, or Firm* — Alix, Yale & Ristas, LLP

(57) ABSTRACT

A self-contained thermal mixing valve includes a cap defining a bore, a relief spring and abutment plate within the bore, and a temperature responsive actuator arranged to generate an actuation force against said abutment plate when exposed to a predetermined increase in temperature. A slide is secured to the actuator and moves with the actuator in response to temperature changes. The slide defines a mixing chamber surrounding the temperature sensitive part of the actuator and includes a fluid flow slot axially aligned with the temperature sensitive part of the actuator. The slide is configured to move along a bore which includes axially offset fluid flow inlets, causing the fluid flow slot to vary fluid flow from the fluid flow inlets into the mixing chamber to produce a mixed outflow within a predetermined temperature range. The relief spring provides mechanical relief to the actuator in over-temperature situations.

6 Claims, 2 Drawing Sheets

(56) References Cited

U.S. PATENT DOCUMENTS

| | | |
|---|---|---|
| 7,617,700 B2 | 11/2009 | Lamb et al. |
| 7,717,351 B2 | 5/2010 | Kline |
| 8,490,885 B2 | 7/2013 | Lamb et al. |
| 2002/0134848 A1* | 9/2002 | Heinzelmann ..... G05D 23/1346 236/12.19 |
| 2013/0075485 A1* | 3/2013 | Hong ........................ F03G 7/06 236/93 R |
| 2013/0334327 A1 | 12/2013 | Lamb et al. |

\* cited by examiner

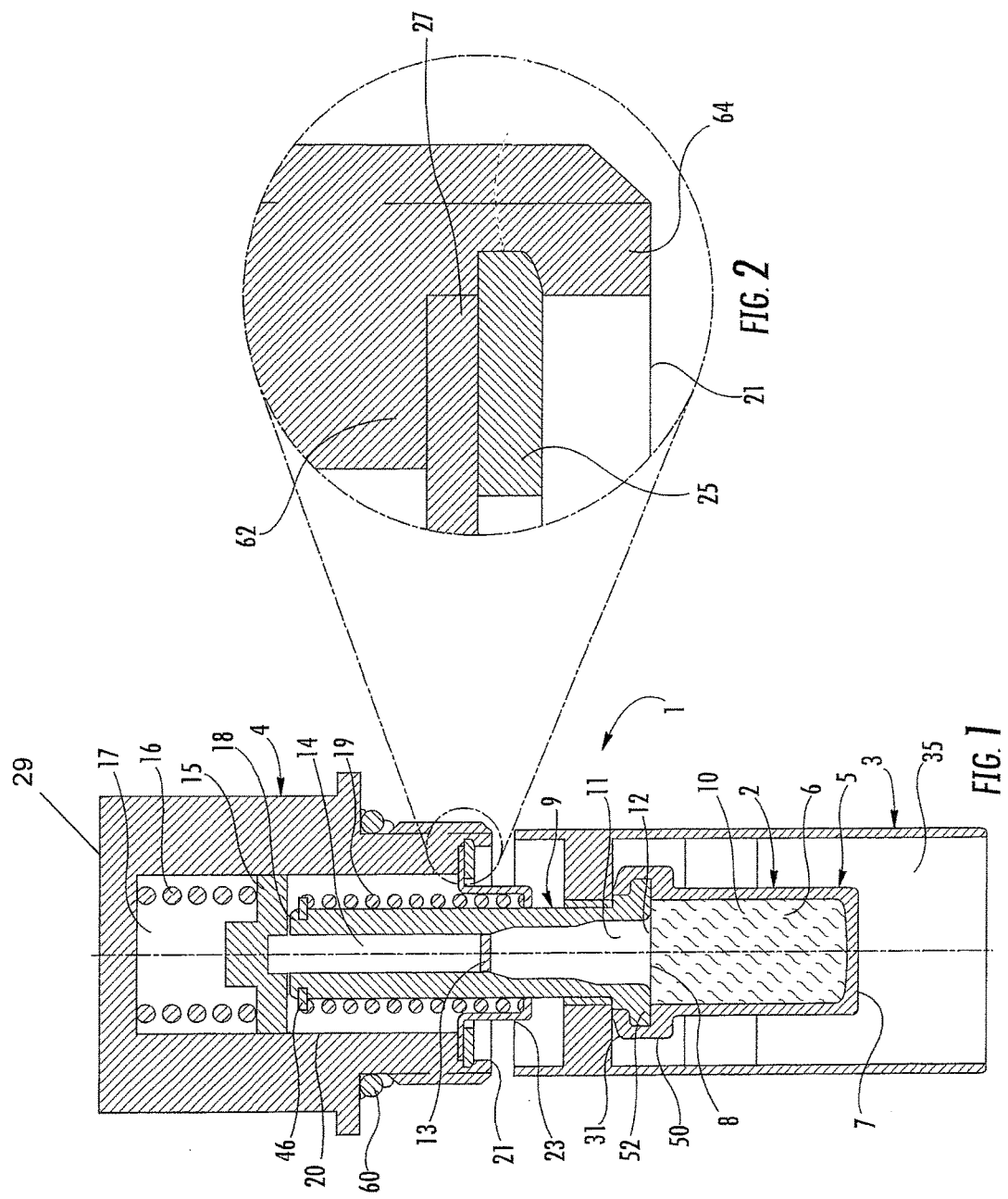

SELF-CONTAINED THERMAL MIXING VALVE

BACKGROUND OF THE DISCLOSURE

The present invention relates to a self-contained thermally actuated mixing valve, particularly of the type wherein a thermally responsive wax generates a force to move an actuator in the form of a push rod or the like. The mixing valve controls the opening and closing of two fluid inlets to create fluid of a desired temperature at a single fluid outlet.

Mixing valves are employed to provide a controlled mixture of fluids of differing temperatures, resulting in an outflow in a pre-determined temperature range. Mixing valves are connected in fluid communication with fluid flows having different temperatures, typically cold and hot and include a temperature sensitive control element. The control element is connected to a valve member that responds to the temperature at an outlet of the mixing valve. Typically a valve member under control of the temperature sensitive control element provides controlled mixing of the hot and cold fluid to provide the outflow at the predetermined temperature or range of temperatures. It is possible to control the inflow of one of the hot or cold fluids to achieve the desired outflow temperature range.

It is common for prior art mixing valves to functionally interface with one or more adjacent structures or surfaces in a manifold or housing, requiring that the mixing valve be at least partially assembled within the manifold or housing. It would be desirable to have a self-contained mixing valve that can be installed and replaced after being fully assembled and calibrated outside the manifold or housing.

SUMMARY

The disclosed embodiment of a self-contained mixing valve includes an actuator, a slide, a return spring, and a relief spring. All the components of the disclosed mixing valve are attached to each other and to a cap, permitting the mixing valve to be installed in a manifold or other structure by threading the cap into a bore configured to accommodate the slide. Self-contained is used in the context of this application to describe a mixing valve where the required springs and actuator cooperate with structures carried with the mixing valve.

In the disclosed embodiment, the actuator is of the wax filled type and includes a thermally responsive wax that generates a variable, temperature dependent force. The slide is a generally cylindrical member attached to the body of the actuator for movement therewith. The slide is closely received in a bore defined by a manifold or housing and defines a circumferentially oriented slot having a known axial position relative to the actuator and hot and cold fluid inlets communicating with the bore. The slide defines a mixing space surrounding the wax-filled chamber of the actuator, and the wax filled chamber is directly exposed to the temperature of fluid in the mixing chamber. Hot and cold fluid inlets to the bore are axially spaced from each other along an axis of the bore that coincides with a direction of slide movement within the bore. The slide is configured to move between a cold position where the slot is open to one of the fluid inlets and closed to the other and a hot position where the slot is closed to the fluid inlet that was open in the cold position and open to the fluid inlet that was closed in the cold position. In the disclosed embodiment, the slot is open to a hot fluid inlet in the cold position and open to a cold fluid inlet in the hot position. Under typical operating conditions, the slot is partially exposed to both the hot and cold fluid inlets, and fluid from the hot and cold inlets mixes in the mixing space defined within the slide.

The thermally responsive wax generates a force causing the slide to move along an axis defined by the bore to achieve a fluid outlet flow at a desired temperature. A return spring generates a force sufficient to move the actuator and slide to a pre-actuated or cold position as temperature in the mixing chamber falls. The disclosed self-contained mixing valve includes built-in relief to prevent damage in the event temperatures in the mixing chamber exceed the maximum temperature for which the mixing valve is intended. A relief spring allows for additional extension of the actuator in extreme over-temperature conditions, preventing damage to the mixing valve in extreme circumstances.

Additionally, the disclosed mixing valve is a self-contained unit. The disclosed mixing valve may be pre-assembled and tested before being installed easily and efficiently as a single unit into a housing or manifold.

BRIEF DESCRIPTION OF THE DRAWINGS

Aspects of the preferred embodiment will be described in reference to the Drawings, where like numerals refer to like elements:

FIG. 1 is a central sectional view of a first embodiment of a thermal mixing valve in accordance with the present invention.

FIG. 2 is a close up section view depicting the annular groove of the cap of FIG. 1.

DETAILED DESCRIPTION

Figure 4:
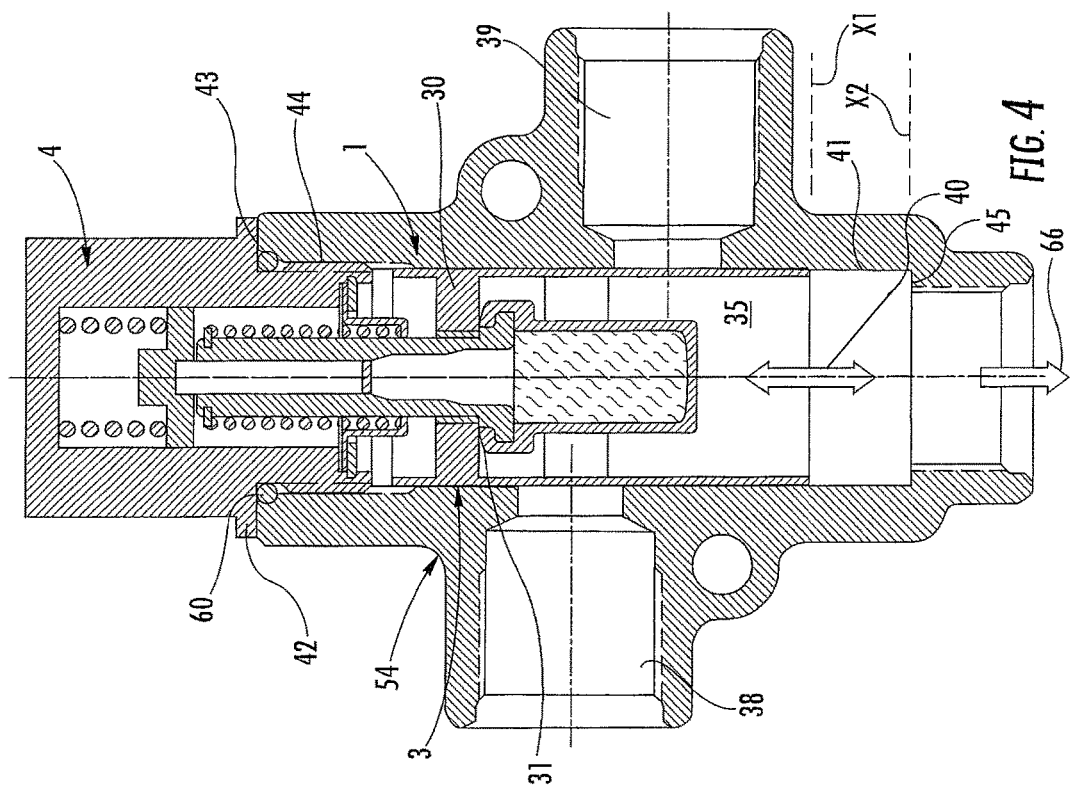
FIG. 4 is a central sectional view of a thermal mixing valve including a surrounding fluid assembly.

A disclosed embodiment of the self-contained thermal mixing valve will now be described with reference to FIGS. 1-4. Referring to FIG. 1, the thermal mixing valve 1 incorporates a thermal actuator 2, a slide 3, and a cap 4.

The thermal actuator 2 includes a rigid cup 5 defining a reservoir 6 extending from a closed bottom 7 of the cup 5 to an opening 8 surrounded by peripheral lip 50. A guide 9 includes a flange 52 that traps a seal diaphragm 12 against the cup 5 and is retained to the cup 5 by deforming the lip 50 around the flange 52 forming a shoulder 31. The cup 5 and guide 9 may be constructed of brass and may be plated to resist corrosion. The seal diaphragm 12 retains the thermally responsive wax 10 in the cup 5 and deforms to permit force from the expanding wax to be transmitted to a plug 11 and piston 14. The expanding wax causes the piston 14 to extend from the open end of the guide 9 against abutment plate 15, generating an actuation force opposed to a return bias of return spring 19. When the actuation force exceeds the return bias force (and friction in the guide and manifold), the actuator 2 moves away from the plate 15 and cap 4 along arrow 40. A slide 3 is secured to the actuator 2 against shoulder 31 and moves with the actuator 2 along bore 41 defined by manifold 54. The reservoir 6 of the cup 5 is filled with a predetermined quantity of thermally responsive wax 10. The thermally responsive wax 10 is selected to provide a desired actuation force F by expansion in response to a known increase in temperature ΔT. As is known in the art, thermally responsive wax can be formulated to expand to generate the actuation force F over a broad range of temperatures.

A plug 11 and piston 14 are arranged in the longitudinal bore of the guide 9 of the actuator 2 and the piston 14 projects from the guide 9 to deliver actuation force generated by the expanding wax 10 to the abutment plate 15.

The cap 4 has a longitudinal bore 20 extending from an open end 21 to a closed end 29. The open end 21 of the cap 4 includes a shoulder 62 surrounded by a lip 64. The lip 64 has an inside diameter sized to receive the flange 27 of a spring cup 23 and a retaining washer 25. The lip 64 is formed over the retaining washer 25 to trap the flange 27 against shoulder 62, thereby retaining the spring cup 23 to the cap 4. The spring cup 23 has a first open end 26 and a second end 28 sized to receive the guide 9 with sufficient radial space for return spring 19 to fit between the cup 23 inside diameter and the guide 9 outside diameter.

Figure 3:
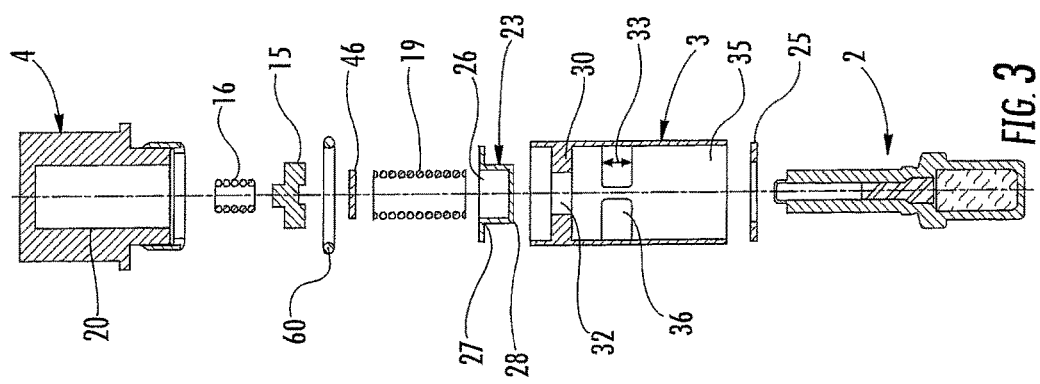
FIG. 3 is an exploded view of the thermal mixing valve of FIG. 1.

Referring to FIGS. 1 and 3, an abutment plate 15 is arranged in the longitudinal bore 20 of the cap 4. A relief spring 16 is compressed between the abutment plate 15 and the closed end 29 of the longitudinal bore 20 of the cap 4. The relief spring 16 compresses to provide mechanical relief in over-temperature situations as described in greater detail below.

The slide 3 is configured to surround the guide 9 and engage the actuator 2 adjacent shoulder 31 for movement with the actuator 2. The slide 3 includes a ledge 30 defining an aperture 32 sized to closely receive guide 9. The slide 3 defines a mixing chamber 35 which surrounds the cup 5 and thermally responsive wax 10 of the actuator 2. The slide 3 defines a slot 36 in communication with the mixing chamber 35. The slide may be constructed of nickel plated brass or other suitable material. The slide may be plated to reduce friction at the interface of the slide with the manifold bore 41. The slot 36 has an axial dimension 33 that is roughly equivalent to the predicted operational stroke of the actuator 2. The slot 36, operational stroke and the axial offset of the hot and cold fluid inlets 38, 39 are coordinated to provide hot/cold mix ratios from 100% hot/0% cold to 0% hot/100% cold.

FIG. 4 illustrates a typical installed configuration for the disclosed mixing valve 1. The mixing valve 1 is installed in a housing 54 to which liquids of two different temperatures are delivered through hot and cold inlet ports 38 and 39, respectively. The actuator 2 and attached sleeve 3 move axially in housing bore 41, regulating fluid flow from the hot fluid inlet 38 and the cold fluid inlet 39 through the slot 36 into the mixing chamber 35 defined within the cylindrical slide 3.

As described above, the plug 11 and piston 14 are configured to transmit force generated by thermal expansion of the wax 10 to abutment plate 15, which results in movement of the actuator 2 and slide 3 within manifold bore 41 along arrow 40. The hot fluid inlet 38 is axially offset from the cold fluid inlet 39 along bore 41, resulting in greater cold fluid flow and reduced hot fluid flow into the mixing chamber 35 as the slide 3 moves along the bore 41 from the cold position X1 toward the (max) hot position X2 shown in FIG. 4. The slot 36 in the slide 3 is aligned with and fully open to the hot fluid inlet 38 at position X1, while the slide 3 covers the cold fluid inlet 39. At the max hot position, the slot 36 is fully open to the cold fluid inlet 39 and covers the hot fluid inlet 38. At most slide positions between X1 and X2, the slot 36 is partially open to both the hot and cold inlets 38, 39, producing a mixed fluid outflow 66 within a pre-determined temperature range.

The temperature and pressure of fluid present at the hot and cold inlets 38, 39 falls within known ranges that are used to design the features of the mixing valve 1 that produce an outflow 66 in a desired temperature range and flow volume.

The components of the mixing valve shown in FIG. 3 are assembled outside the manifold and can be tested as an assembly before installation. The slide 3 is secured to the actuator 2 by any conventional means, such as threads, adhesive, mechanical deformation or the like. The connection should be one that will withstand the forces expected to be generated within the mixing valve 1 during operation. The guide 9 includes a groove at 18 which receives a spring clip 46 that secures one end of the return bias spring 19 to the guide 9. The opposite end of the return bias spring 19 is surrounded by a spring cup 23. The spring cup 23 has a flange 27 that is secured in the open end of the cap 4 so that return spring 19 is compressed between the spring cup 23 and the spring clip 46, resulting in a return bias on the actuator 2 and attached sleeve 3 toward the cold position X1. The return bias is sufficient to overcome the friction of the piston 14 in the guide 9 and the slide 3 in the manifold bore 41. Correct return bias ensures that the actuator 2 and slide 3 return toward the cold position X1 as temperatures in mixing chamber 35 fall. Relief spring 16 and abutment plate 15 are inserted into cavity 17 of cap 4 before the actuator 2 is secured to the cap 4 by connecting the flange 27 of spring cup 23 to the cap 4. The resulting self-contained mixing valve assembly 1 is shown in FIG. 1. The self-contained mixing valve assembly 1 can be secured to the manifold 54 by any conventional means 44, including threads, force fit, adhesive, etc. A seal 60, ensures a fluid tight connection with the manifold 54 when flange 42 of the cap 4 abuts the end 43 of the manifold 54 as shown in FIG. 4.

The cap 4 defines a cavity 17 into which a relief spring 16 and abutment plate 15 are inserted. The force of relief spring 16 is greater than an actuating force required to move the actuator 2 and slide 3 to the max hot position X2. The abutment plate 15 and relief spring 16 are configured to provide mechanical relief in a situation where the actuator 2 and slide 3 are in the max hot position X2 and the end of slide 3 is in contact with housing shoulder 45 (shown in FIG. 4). This may occur in an over-temperature situation where cold fluid is not present at the cold fluid inlet 39 or some other failure results in temperature in the mixing chamber 35 exceeding the maximum expected temperature range. As the temperature in mixing chamber 35 continues to rise, the wax 10 in the actuator 2 continues to expand and extend the length of the actuator 2 against the abutment plate 15. In the absence of relief, the actuator 2 can damage itself or the housing 54, resulting in failure. A mixing valve failure that results in rupture of the reservoir 6 would greatly reduce or eliminate an actuating force generated by the actuator 2, and the return bias of spring 19 would return the actuator 2 and slide 3 to the cold position X1, shutting off fluid flow to the outlet from the cold fluid inlet 39 while opening the hot fluid inlet 38. Such a failure could be catastrophic. In the disclosed embodiment, in the event of an over-temperature condition in mixing chamber 35, excess force generated by the actuator 2 is absorbed by relief spring 16, which compresses, allowing the abutment plate 15 to move along cup bore 20, relieving mechanical pressure on the actuator components, while maintaining the slide 3 in a position where the slot 36 is fully open to the cold fluid inlet 39.

What we claim is:

1. A temperature sensitive fluid flow mixing valve comprising:

a cap having a closed end and an axially opposite open end, said cap having a shoulder adjacent said open end disposed radially inward from an outer edge;

an abutment plate within said cap;

a relief bias member arranged between said abutment plate and said cap closed end, said relief bias member exerting a relief force against said abutment plate;

an actuator including a cup filled with temperature responsive wax, a guide secured to said cup, said guide defining an axial bore from which a piston is arranged to axially extend when exposed to an actuation force generated by said wax in response to a predetermined increase in temperature, said actuator secured to said cap via a spring cup so that said piston is in contact with said abutment plate, a return bias member arranged to exert a return bias force on said actuator, said return bias force axially opposed to said actuation force;

a slide secured to said actuator for movement therewith, said slide having a generally cylindrical body closed at one end by said guide, said slide having a mixing chamber surrounding said cup, said mixing chamber axially aligned with said cup, and said body defining a fluid flow slot radially through said cylindrical body at a position axially aligned with said cup, wherein when said actuation force exceeds said return bias force, said piston extends from said guide, moving said actuator and said slide away from said cap, said relief force being greater than said actuation force.

2. The mixing valve of claim 1, wherein said actuator has an axial stroke between a cold length and a hot length and said fluid flow slot has an axial dimension, the axial stroke being substantially equivalent to the axial dimension of said fluid flow slot.

3. The mixing valve of claim 1 wherein said abutment plate further comprises an axial seat for engagement with said piston.

4. The mixing valve of claim 1, wherein the spring cup surrounds said guide and is secured to said cap, said spring cup including an inward directed shoulder in contact with one end of said return bias member.

5. The mixing valve of claim 4, wherein said return bias member is compressed between said inward directed shoulder and a radial projection on said guide.

6. The mixing valve of claim 1, wherein the mixing valve is configured for installation in a manifold defining first and second axially offset fluid flow inlets, said fluid flow slot axially aligned with one of said fluid flow inlets in a first position and moving toward said second fluid flow inlet when said actuation force exceeds said return bias force.

\* \* \* \* \*